United States Patent [19]

Sato

[11] Patent Number: 5,077,463
[45] Date of Patent: Dec. 31, 1991

[54] BAR CODE READING APPARATUS

[75] Inventor: Shinichi Sato, Kawasaki, Japan

[73] Assignee: Fujitsu Limited, Kawasaki, Japan

[21] Appl. No.: 487,326

[22] Filed: Mar. 2, 1990

[30] Foreign Application Priority Data

Mar. 3, 1989 [JP] Japan .................................. 1-51294

[51] Int. Cl.$^5$ .............................................. G06K 7/10
[52] U.S. Cl. .................................... 235/463; 235/436; 235/462; 235/494
[58] Field of Search ................. 235/436, 462, 463, 494

[56] References Cited

U.S. PATENT DOCUMENTS

| 4,074,852 | 2/1978 | Wescott et al. ..................... 235/463 |
| 4,125,765 | 11/1978 | Cowardin et al. . |
| 4,130,243 | 12/1978 | Seligman ............................. 235/462 |
| 4,379,224 | 4/1983 | Engstrom . |
| 4,488,678 | 12/1984 | Hara .................................... 235/463 |
| 4,864,112 | 9/1989 | Imai et al. ........................... 235/463 |

Primary Examiner—Harold Pitts
Attorney, Agent, or Firm—Armstrong, Nikaido, Marvelstein, Kubovcik & Murray

[57] ABSTRACT

A bar code reading apparatus includes a scanner, and a measuring circuit for measuring a width of each white bar contained in the bar code and a width of each black bar contained therein and for outputting a measurement signal indicative of the width of the each white or black bar. Further, the apparatus includes first, second and third detection circuits. The first detection circuit detects, from the measurement signal, a white bar having a width equal to or greater than a first reference value and outputs a first detection signal indicative of the width of the white bar. The second detection circuit detects, from the measurement signal, a white bar having a width equal to or greater than a second reference value and outputs a second detection signal indicative of the width of the white bar, the second reference being less than the first reference. The third detection circuit detects, from the measurement signal, a black bar having a width equal or greater than a third reference value and outputs a third detection signal indicative of the width of the black bar. A logic circuit receives the first, second and third detection signals and outputs a margin detection signal indicating detection of the margin area on the basis of the first, second and third detection signals.

19 Claims, 9 Drawing Sheets

FIG. IA
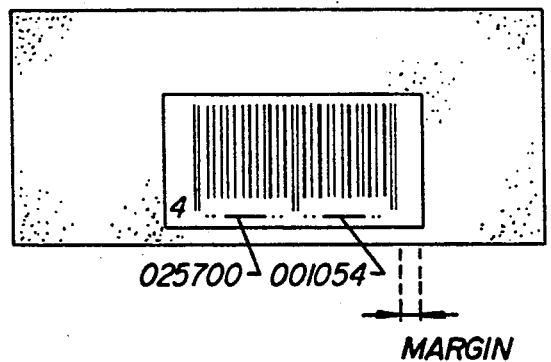
FIG. IB
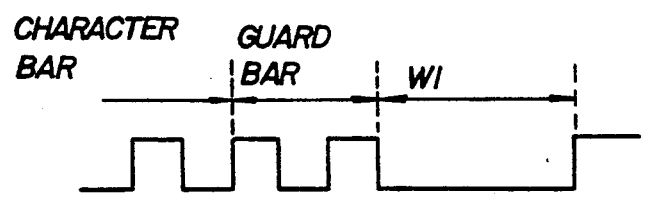
FIG. IC
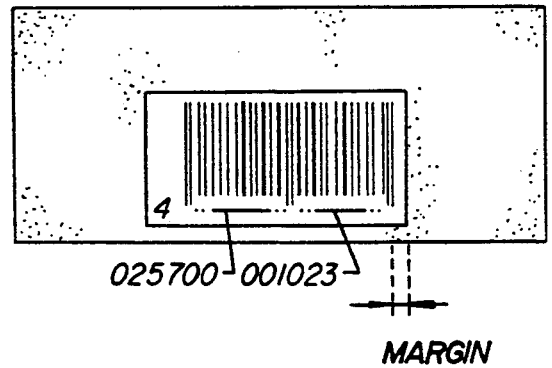
FIG. ID
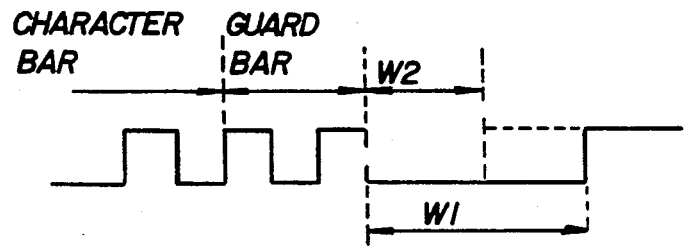

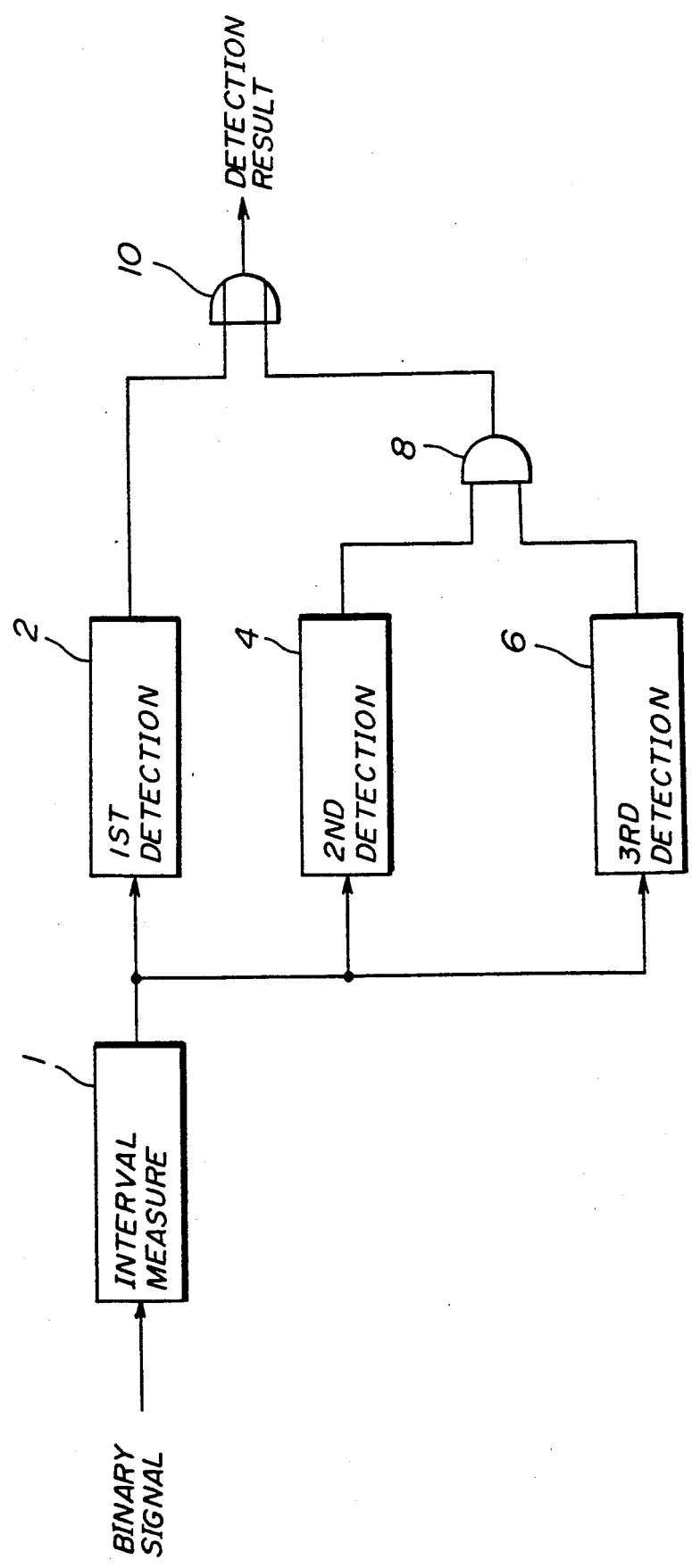

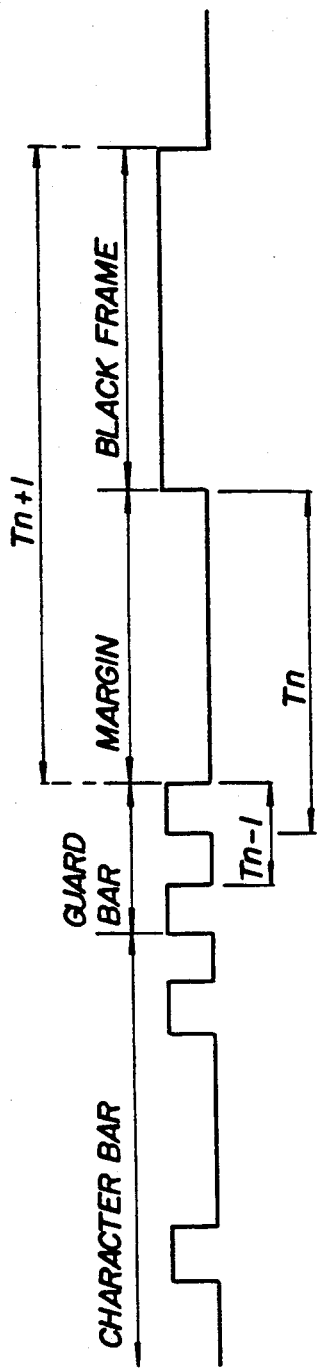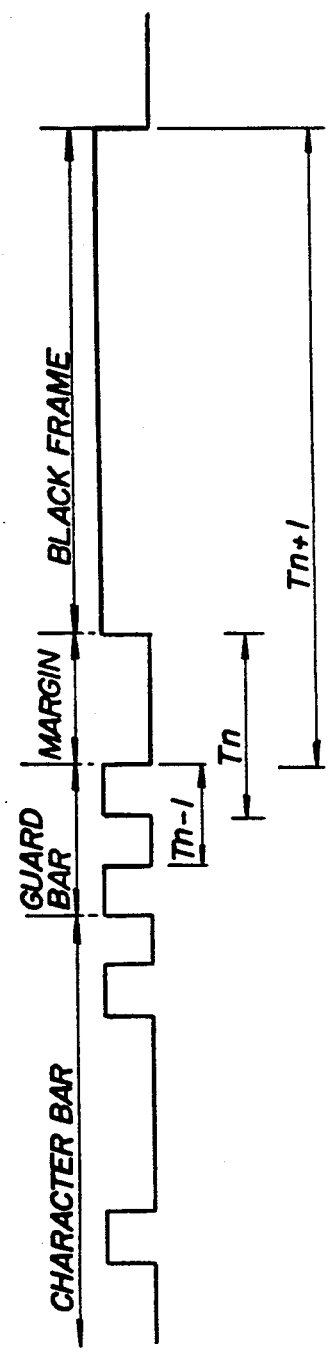

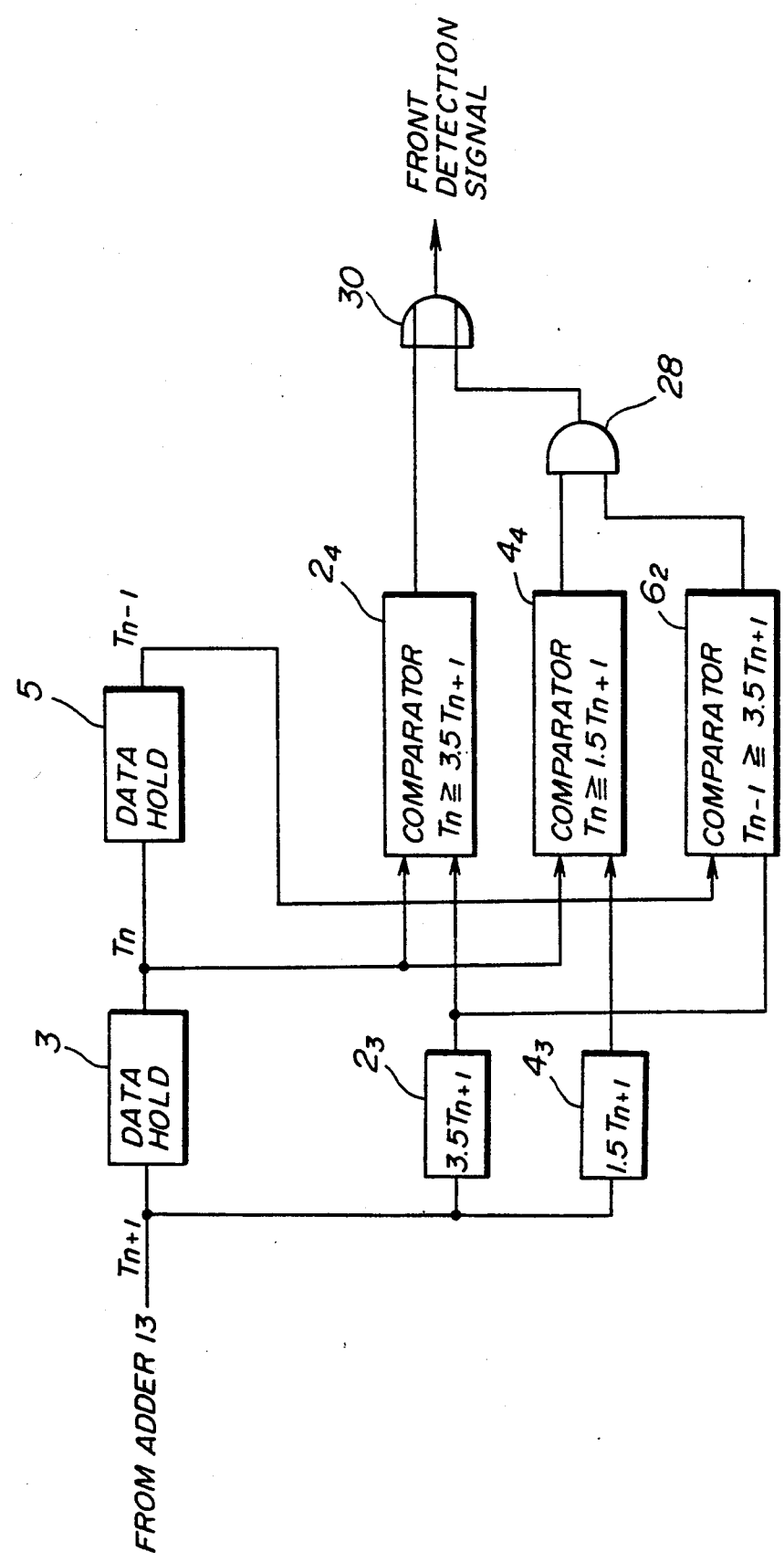

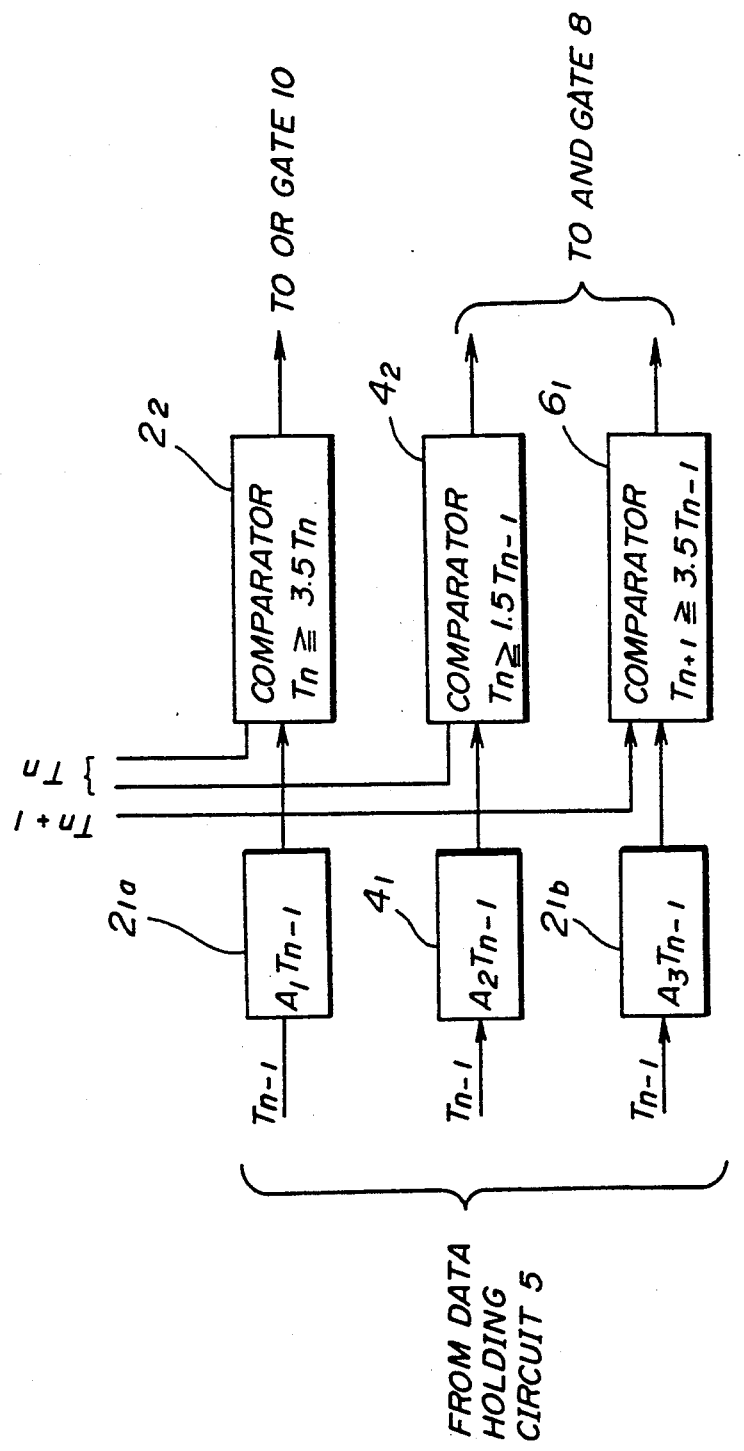

BAR CODE READING APPARATUS

BACKGROUND OF THE INVENTION

The present invention generally relates to a bar code reading apparatus, and more particularly to a bar code reading apparatus capable of precisely reading a bar code even when it is printed on a wrapper or the like with a positional error so that a margin area preceding or following the bar code is less than a predetermined width.

Conventionally, a bar code reading apparatus is used in a point-of-sales system. The bar code reading apparatus reads bar codes attached to wrappers of goods or the like. As is known, it is necessary to precisely recognize margin areas provided before and after the bar code and thereby read the bar code without errors.

A conventional bar code reading apparatus scans a bar code by a scanner and determines whether a margin area (normally a "white" area) is equal to or greater than a predetermined width (generally equal to seven modules). Such a bar code reading apparatus is disclosed in U.S. Pat. No. 4,074,852.

As shown in FIGS. 1A and 1B there is no problem when the conventional bar code reading apparatus scans a margin area which is equal to or greater than a predetermined width W1. It is noted that the last character bar is followed by guard bars, which are followed by the margin area. A low level of the illustrated signal indicates "white", and a black level thereof indicates "black". In contract, the conventional bar code reading apparatus cannot read bar codes precisely in a case where as shown in FIG. 1B, a bar code is printed in a rectangular white area surrounded by a black area (margin defining area or black frame) so that a margin area before or after the bar code is less than the predetermined width W1 (in the illustrated case, a back margin area after the guard bars has a width W2 less than the predetermined width W1). A similar problem may occur in a case where a front portion and/or a back portion itself of a bar code is curved, a bar code label attached on a wrapper is warped due to the presence a good contained therein.

SUMMARY OF THE INVENTION

It is a general object of the present invention to provide an improved bar code reading apparatus in which the above-mentioned disadvantages are eliminated.

A more specific object of the present invention is to provide a bar code reading apparatus capable of correctly margin areas located before and after the bar code so that it can be read precisely.

The above objects of the present invention are achieved by a bar code reading apparatus comprising scanning means for scanning a bar code including a character bar and a guard bar facing a margin area surrounded by a margin defining area and for generating a pulse signal corresponding to the bar code; and measuring means coupled to the scanning means, for measuring a width of each white bar contained in the bar code and a width of each black bar contained therein and for outputting a measurement signal indicative of the width of the each white or black bar. Further the apparatus comprises first detection means, operatively coupled to the measuring means, for detecting, from the measurement signal, a white bar having a width equal to or greater than a first reference value and for outputting a first detection signal indicative of the width of the white bar; second detection means, operatively coupled to the measuring means, for detecting, from the measurement signal, a white bar having a width equal to or greater than a second reference value and for outputting a second detection signal indicative of the width of the white bar, the second reference being less than the first reference; third detection means, operatively coupled to the measuring means, for detecting, from the measurement signal, a black bar having a width equal or greater than a third reference value and for outputting a third detection signal indicative of the width of the black bar; and logic means coupled to the first, second and third detection means, for receiving the first, second and third detection signals and outputting a margin detection signal indicating detection of the margin area on the basis of the first, second and third detection signals.

The aforementioned objects of the present invention are also achieved by a bar code reading apparatus comprising scanning means for scanning a bar code including a character bar and guard bars facing front and back margin areas surrounded by a margin defining area and for generating a pulse signal corresponding to the bar code; and measuring means coupled to the scanning means, for measuring a width of each white bar contained in the bar code and a width of each black bar contained therein and for outputting a measurement signal indicative of the width of the each white or black bar, the measurement signal includes a time-series of measured value signals $T_{n-1}$ (n is an integer), $T_n$ and $T_{n+1}$. The apparatus further comprises first holding means coupled to the measuring means, for holding one of the measured value signals until a next one of the measured value signals is output from the measuring means so that when the measured value signal $T_{n+1}$ is applied to the first holding means, the first holding means outputs the measured signal $T_n$; second holding means coupled to the first holding means, for holding one of the measured value signals from the first holding means until a next one of the measured value signals is output from the first holding means so that when the measured value signal $T_{n+1}$ is applied to the second holding means, the second holding means outputs the measured value signal $T_{n-1}$; first multiplying means coupled to the second holding means, for multiplying the measured value signal $T_{n-1}$ by a first constant $A_1$ and for outputting a signal $A_1 T_{n-1}$; and first comparing means coupled to the first holding means and the first multiplying means, for determining whether the measured value signal $T_n$ is equal to or greater than $A_1 T_{n-1}$ and for outputting a first detection signal based on a comparison result. The apparatus further comprises second multiplying means coupled to the second holding means, for multiplying the measured value signal $T_{n-1}$ by a second constant $A_2$ and for outputting a signal $A_2 T_{n-1}$; second comparing means coupled to the first holding means and the second multiplying means, for determining whether the measured value signal $T_n$ is equal to $A_2 T_{n-1}$ and for outputting a second detection signal based on a comparison result; third comparing means coupled to the measuring means and the first multiplying means, for determining whether the measured value signal $T_{n+1}$ is equal to or greater than the signal $A_1 T_{n-1}$ and for outputting a third detection signal based on a comparison result; and third multiplying means coupled to the first holding means, for multiplying the measured value signal $T_{n+1}$ by a third constant $A_1'$ and for outputting a signal $A_1'T_{n+1}$. The apparatus further comprises fourth comparing means coupled to the measuring means and the third multiplying means, for determining whether the measured value signal $T_n$ is equal to or greater than $A_1'T_{n+1}$ and for outputting a fourth detection signal based on a comparison result; fourth multiplying means coupled to the measuring means, for multiplying the measured value signal $T_{n+1}$ by a fifth constant $A_2'$ and for outputting a signal $A_2'T_{n+1}$; fifth comparing means coupled to the first holding means and the fourth multiplying means, for determining whether the measured value signal $T_n$ is equal to $A_2'T_{n+1}$ and for outputting a fifth detection signal based on a comparison result; sixth comparing means coupled to the second holding means and the third multiplying means, for determining whether the measured value signal $T_{n-1}$ is equal to or greater than the signal $A_1'T_{n+1}$ and for outputting a sixth detection signal based on a comparison result; and logic means for receiving the first through sixth detection signals and for outputting a margin detection signal indicative of the front and back margins on the basis of the first through sixth detection signal. Alternatively, it is possible to provide multiplier means separately for each of the third and sixth detection means.

Further objects, features and advantages of the present invention will become apparent from the following detailed description when read in conjunction with the accompanying drawings.

BRIEF DESCRIPTION OF THE DRAWINGS

FIGS. 1A and 1B is a diagram illustrating a case where an appropriate margin area after a bar code is scanned by a conventional bar code apparatus;

FIGS. 1C and 1D is a diagram illustrating a problem caused in the conventional bar code apparatus;

FIG. 2 is a block diagram illustrating an outline of a bar code reading apparatus according to the present invention;

FIGS. 3A and 3B is a waveform diagrams illustrating the operation of the present invention;

FIG. 6 is a block diagram of a bar code reading apparatus according to a second preferred embodiment of the present invention;

FIG. 9A is a block diagram of a variation of the first embodiment shown in FIG. 5;

DESCRIPTION OF THE PREFERRED EMBODIMENTS

Figure 4:
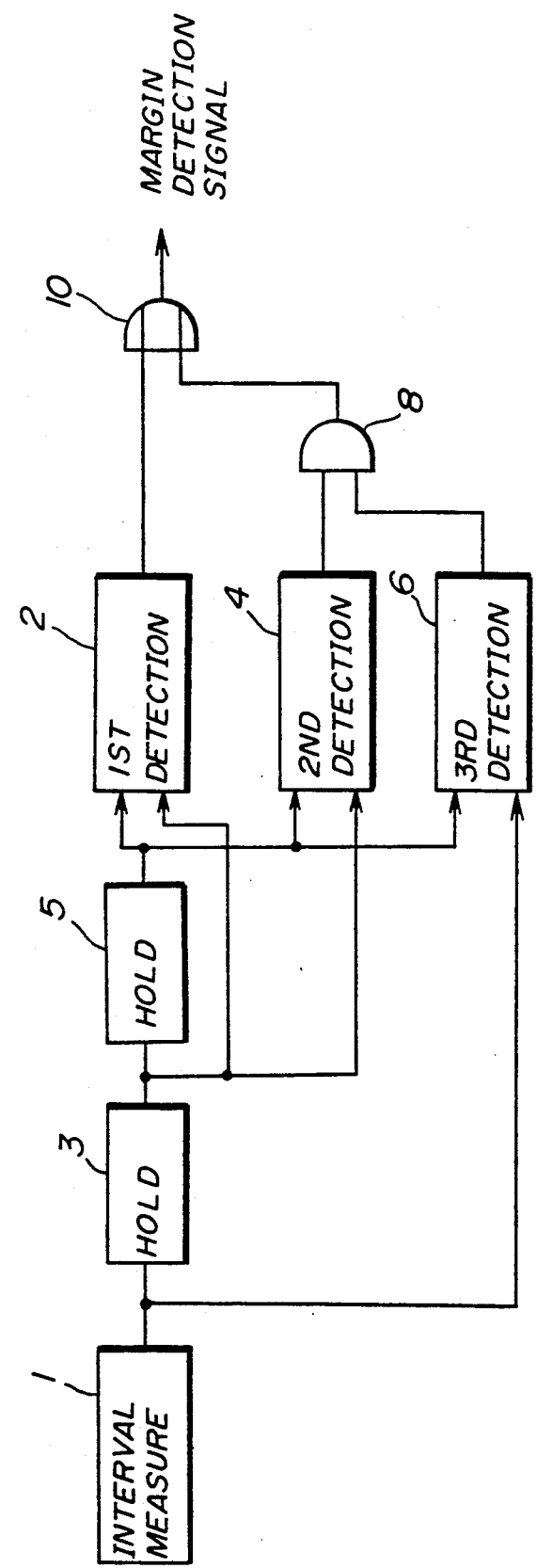
FIG. 4 is a block diagram illustrating a detailed configuration of the bar code reading apparatus shown in FIG. 2.

Referring to FIG. 2, there is illustrated a general configuration of a bar code reading apparatus according to the present invention. The bar code reading apparatus in FIG. 2 includes an interval measuring circuit 1, a first detection circuit 2, a second detection circuit 4, a third decision circuit 6, an AND gate 8 and an OR gate 10.

The interval measuring circuit 1 measures an interval between the leading edges of two consecutive pulses of a binarized signal applied thereto and generates a measurement signal indicative of the measured interval. Further, the interval measuring circuit 1 measures an interval between the trailing edges of two adjacent pulses thereof and generates a measurement signal indicative of the measured interval. That is, the interval measuring circuit 1 measures the sum of the widths of adjacent white and black (black and white) bars. Such an interval is frequently called a delta distance. Hereinafter, the sum of the widths of the adjacent white and black (black and white) bars which is output from the interval measuring circuit 1 is referred to as a measured interval or width.

The first, second and third detection circuits 2, 4 and 6 use a time-series of measured intervals $T_{n-1}$ (n an integer), $T_n$ and $T_{n+1}$. For example, as shown in FIG. 3, $T_{n-1}$, $T_n$ and $T_{n+1}$ relate to a guard bar, a back margin area and a margin defining area (a black frame), respectively. As will be described in detail later, the width of each white or black bar is represented by the sum of the widths of two consecutive white and black or black and white bars.

The first detection circuit 2 detects a white bar having a width equal to or greater than a first reference value, which is a multiple of a value equal to one module. For this purpose, the first detection circuit 2 determines whether or not the measured interval Tn relating to the margin area (it can also be said that Tn is the width of the margin area) is equal to or greater than the first reference value. When the margin area has a width equal to seven modules, the first reference value is set equal to or greater than seven modules. In other words, the first reference value is a multiple of the measured interval $T_{n-1}$, $A_1T_{n-1}$ where $A_1$ is a coefficient. It is noted that $T_{n-1}$ corresponds to the sum of the width of the white guard bar and the width of the subsequent black guard bar, i.e., two modules. That is, the first detection circuit 2 determines whether or not the measured interval Tn is equal to or greater than $A_1T_{n-1}$. When the margin area is equal to seven modules, it is preferable that the coefficient $A_1$ be equal to or greater than 3.5. That is, the first reference value $A_1T_{n-1}$ corresponds to a normal width of the margin area.

The second detection circuit 4 detects a white bar which is equal to or greater than a second reference less than the aforementioned first reference value. For this purpose, the second detection circuit 4 determines whether or not the measured interval Tn is equal or greater than a second reference value. It is preferable that the second reference value be equal to a multiple of the measured interval $T_{n-1}$, $A_2T_{n-1}$ where $A_2$ is a coefficient and is less than the coefficient $A_1$. When the margin area is equal to seven modules, it is preferable that the coefficient $A_2$ be equal to or greater than 1.25 and is equal to or less than 3.5. In this case, the second detection circuit 4 detects a white bar (margin area) having a width between 2.5 times the one-module and 7 times the one-module. That is, the second detection circuit 4 is directed to determining whether or not the margin area has a width equal to or greater than a minimum margin area width ($A_2T_{n-1}$), which is considered as a margin area.

The third detection circuit 6 detects a black bar (margin defining area) having a width equal to or greater than a third reference value. For this purpose, the third detection circuit 6 determines whether or not the measured interval $T_{n+1}$ relating to the margin defining area is equal to or greater than a third reference value. It is preferable that the third reference value be equal to a multiple of the measured interval $T_{n-1}$ relating to the guard bar, $A_3T_{n-1}$ where $A_3$ is a coefficient. The third detection circuit 6 is directed to determining whether or not a black area having a sufficient width follows or precedes the white area (margin area) before or after this black area. When the margin area is equal to seven modules, it is preferable that the coefficient $A_3$ be equal to or greater than 3. In this case, the third detection circuit 6 detects a black bar (margin defining area) having a width equal to or greater than six modules. That is, the third reference value $A_3T_{n-1}$ corresponds to a normal width of the margin area. As will be described in detail later, the first, second and third detection circuits 2, 4 and 6 operates in a similar way when the front margin area is detected.

Detection signals from the second and third detection circuits 4 and 6 are supplied to the AND gate 8. Outputs from the first detection circuit 2 and the AND gate 10 are supplied to the OR gate, which outputs a margin detection signal. It is noted that the first detection circuit 2 is based on a conventional margin detection algorithm. Thus, there is a possibility that the first detection circuit 2 does not detect margin areas correctly due to a poor positioning precision in printing the bar code in the white area defined by the black frame (margin defining area), for example. Even in such a case, the second and third detection circuits can correctly detect a margin area having a width less than the predetermined width (equal to seven modules, for example).

Actually, as shown in FIG. 4, the configuration shown in FIG. 2 includes a first data holding circuit 3 and a second holding circuit 5. The first data holding circuit 3 holds the current measured interval from the interval measuring circuit 1 until a next measured interval is output from the interval measuring circuit 1. An output signal from the first data holding circuit 3 is supplied to the second data holding circuit 5 and the first and second detection circuits 2 and 4. The second holding circuit 5 holds the current measured interval from the first holding circuit 3 until the next data measured interval is output from the first data holding circuit 3. An output signal from the second holding circuit 5 is supplied to the first, second and third detection circuits 2, 4 and 6. With this arrangement of the first and second data holding circuits 3 and 5, the measured intervals $T_{n-1}$, $T_n$ and $T_{n+1}$ are supplied to the first, second and third holding circuits 2, 4 and 6 at the same timing.

Figure 5:
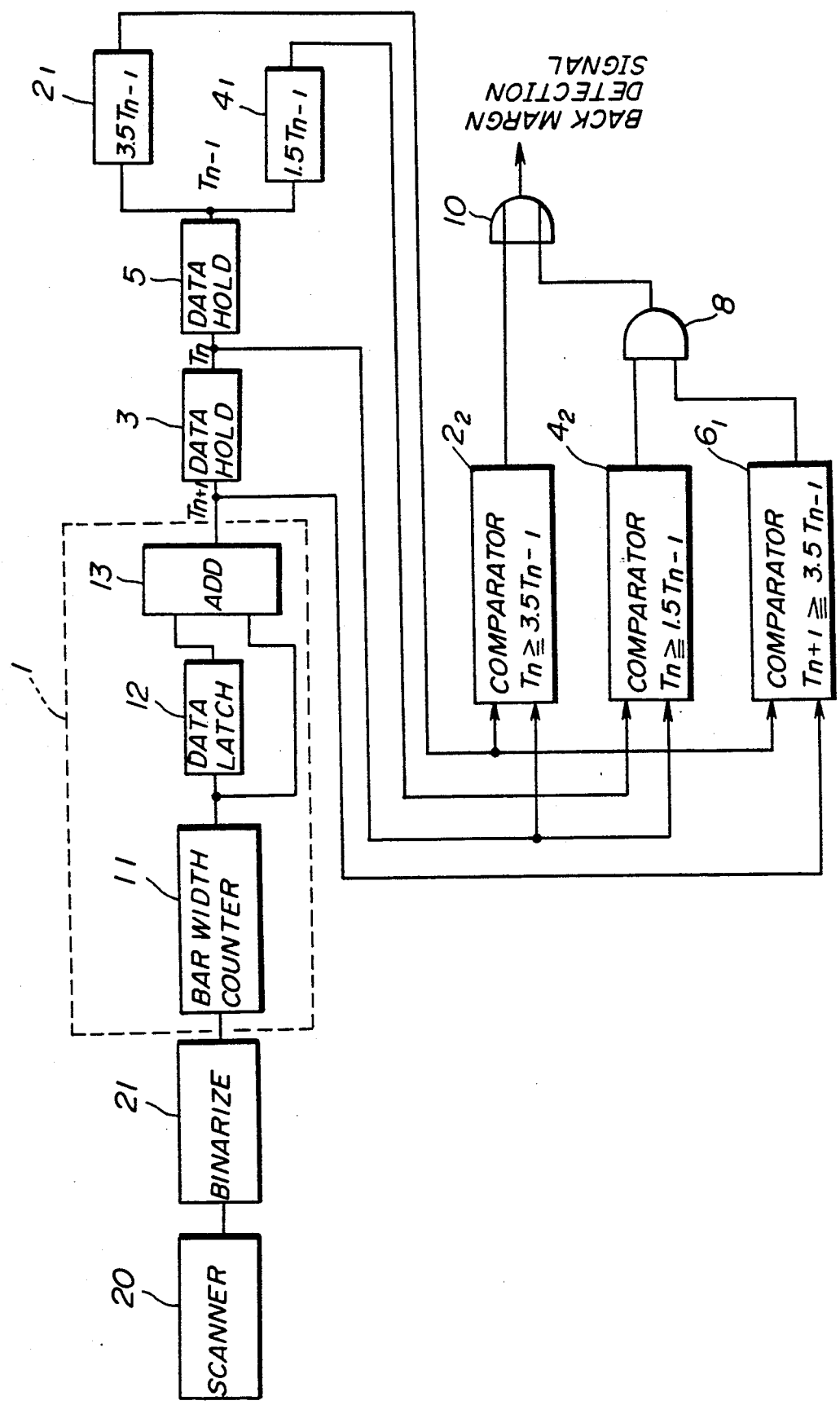
FIG. 5 is a block diagram of a bar code reading apparatus according to a preferred embodiment of the present invention.

FIG. 5 is a detailed block diagram of the bar code reading apparatus shown in FIG. 4, in which those parts which are the same as those shown in the previous figures are given the same reference numerals. The configuration shown in FIG. 5 is directed to precisely detecting a back margin area following the bar code. Referring to FIG. 5, a bar code scanner 20 scans a bar code and generates an electrical output signal. A binarization circuit 21 binarizes the output signal from the bar code scanner 21, and supplies the interval measuring circuit 1 with a binarized digital signal. The interval measuring circuit 1 is made up of a bar width counter 11, a data latch circuit 12 and an adder 13. The bar width counter 11 measures the width of each white/-black bar. The data latch circuit 12 latches the current bar width until the width of the next bar is output from the bar width counter 11. The adder 13 adds output signals from the bar width counter 11 and the data latch circuit 12. When the signal from the bar width counter 11 relates to a white bar, the signal from the data latch circuit 12 relates to a black bar preceding the white bar. In contract, when the signal from the bar width counter 11 relates to a black bar, the signal from the data latch circuit 12 relates to a white bar preceding the black bar. The adder 13 outputs the sum of the width of the white bar (black bar) and the width of the black bar (white bar). The sum output from the adder 13 corresponds to the aforementioned measured interval. The sum of the width of a white bar and the width of a black bar following this white bar is handled so as to represent the width of the white bar. The sum of the width of a black bar and the width of a white bar following this black bar is handled so as to represent the width of the black bar.

The output signal from the adder 13 is supplied to the first data holding circuit 3 and a comparator $6_1$, which is a part of the third detection circuit 6 shown in FIG. 4. The first data holding circuit (latch circuit) 3 holds the current measured interval from the adder 13 until the next output measured interval is output therefrom. The output signal from the first data holding circuit 3 is supplied to the second data holding circuit (latch circuit) 5 and comparators $2_2$ and $4_2$. The second data holding circuit 5 holds the current measured interval until the next measured interval is output therefrom. The output signal from the second data holding circuit 5 is supplied to multipliers $2_1$ and $4_1$.

The first detection circuit 2 shown in FIG. 4 is composed of the multiplier $2_1$ and the comparator $2_2$. The second detection circuit 2 shown in FIG. 4 is composed of the multiplier $2_1$ and the comparator $4_2$. The third detection circuit 6 shown in FIG. 4 is composed of the multiplier $2_1$ and the comparator $6_1$. In the configuration shown in FIG. 5, the aforementioned constant $A_1$ is set equal to the constant $A_3$, and $A_1 = A_3 = 3.5$. Further, the constant $A_2$ is set equal to 1.5. The multiplier $2_1$ multiplies the output signal (measured interval) by 3.5. The multiplier $4_1$ multiplies the output signal $T_{n-1}$ (measured interval) by 1.5. An output signal from the multiplier $2_1$ is supplied to the comparators $2_2$ and $6_1$. An output signal from the multiplier $4_1$ is supplied to the comparator $4_2$.

When the adder 13 outputs the measured interval $T_{n+1}$, the data holding circuits 3 and 5 output the measured intervals $T_n$ and $T_{n-1}$, respectively, and the multipliers $2_1$ and $4_1$ output $3.5T_{n-1}$ and $1.5T_{n-1}$, respectively. The comparator $2_2$ determines whether or not the measured interval $T_n$ is equal to or greater than $3.5T_{n-1}$ ($T_n \geq 3.5T_{n-1}$). The comparator $4_2$ determines whether or not the measured interval $T_n$ is equal to or greater than $1.5T_{n-1}$ ($T_n \geq 1.5T_n$). The comparator $6_1$ determines whether or not the measured interval $T_{n+1}$ is equal to or greater than $3.5T_{n-1}$ ($T_{n+1} \geq 3.5T_{n-1}$). Detection signals from the comparators $4_2$ and $6_1$ are supplied to the AND gate 8. Output signals $2_2$ and the AND gate 8 are supplied to the OR gate 10, which outputs a back margin detection signal.

Referring to FIG. 3A, when $T_n \geq 3.5T_{n-1}$, the comparator $2_2$ outputs a high-level signal, which passes through the OR gate 10 and is output as the back margin detection signal. FIG. 3(B) illustrates a case where the measured interval $T_n$ is less than $3.5T_{n-1}$. In this case, the output of the comparator $2_2$ is low. When $T_n \geq 1.5T_{n-1}$ and $T_{n+1} \geq 3.5T_{n-1}$, the comparators $4_2$ and $6_1$ generate high-level outputs. In this case, the AND gate 8 generates a high-level output, which passes through the OR gate 10 and is drawn as the back margin detection signal. Thus, it is possible to detect a bar code which is printed out of the predetermined position in a white area surrounded by a black margin defining area or which is curved so that the margin area before or after the bar code is less in width than the predetermined value.

Figure 7A:
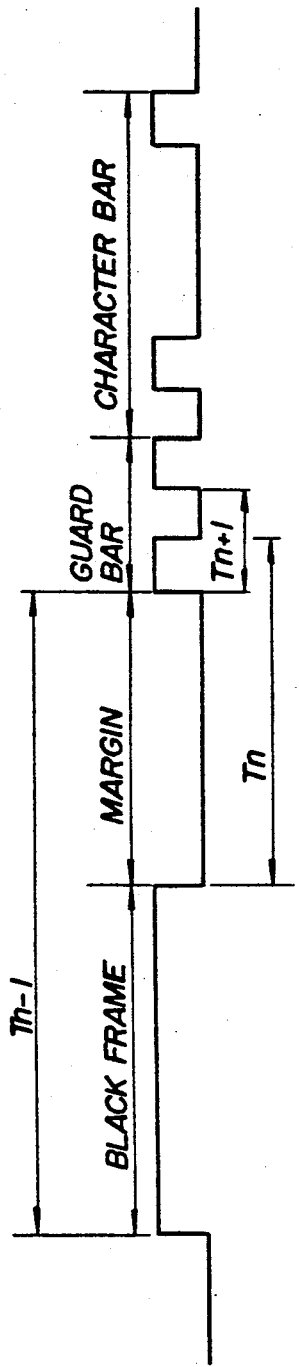
FIGS. 7A and 7B is a waveform diagrams illustrating the operation of the second embodiment shown in FIG. 6.
Figure 7B:
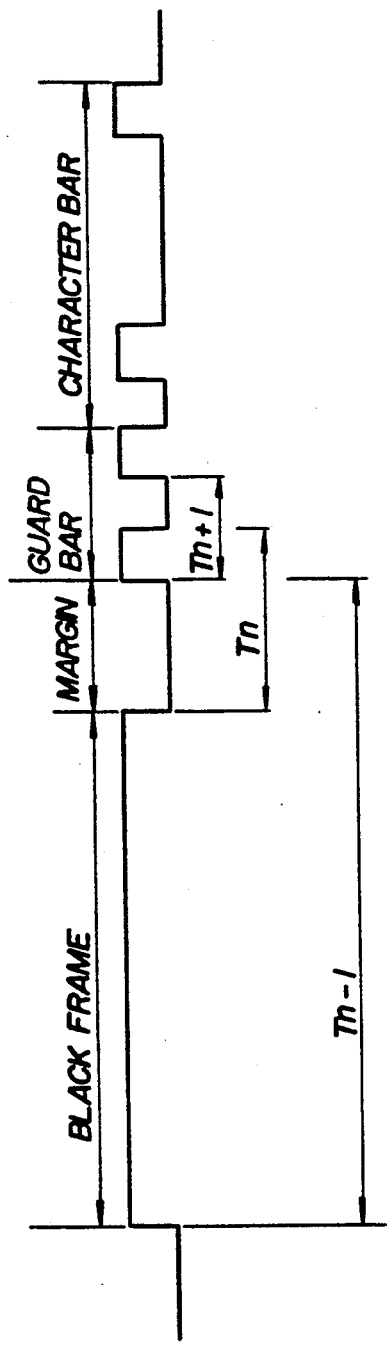

A description is given of a second embodiment of the present invention with reference to FIGS. 6, 7A and 7B, in which those parts which are the same as those shown in FIG. 5 are given the same reference numerals. The second embodiment is directed to precisely detecting a front margin area which precedes the bar code. Referring to FIGS. 6, 7A and 7B, when the measured interval $T_{n-1}$ relating to the black frame area (margin defining area) is output from the data holding circuit 5, the measured interval $T_{n+1}$ relating to the guard bar is applied to the data holding circuit 3, and the measured interval $T_n$ relating to the margin area is output from the data holding circuit 3.

The measured interval $T_{n+1}$ is applied to multipliers $2_3$ and $4_3$. The multiplier $2_3$ multiplies the measured interval $T_{n+1}$ by 3.5, and the multiplier $4_3$ multiplies the measured interval $T_{n+1}$ by 1.5. An output signal from the multiplier $2_3$ is input to comparators $2_4$ and $6_2$, and an output signal from the multiplier $4_3$ is input to a comparator $4_4$. The first detection circuit 2 shown in FIG. 2 is composed of the multiplier $2_3$ and the comparator $2_4$. The second decision circuit 4 shown in FIG. 2 is composed of the multiplier $4_3$ and the comparator $4_4$. The third detection circuit 6 shown in FIG. 2 is composed of the multiplier $2_3$ and the comparator $6_2$.

The comparator $2_4$ compares the measured interval $T_n$ with the multiplied interval $3.5T_{n+1}$ and determines whether $T_n \geq 3.5T_{n+1}$. The comparator $4_4$ compares the measured interval $T_n$ with the multiplied interval $1.5T_{n+1}$ and determines whether $T_n \geq 1.5T_{n+1}$. The comparator $6_2$ compares the measured interval $T_{n-1}$ with the multiplied interval $3.5T_{n+1}$ and determines whether $T_{n-1} \geq 3.5\ T_{n+1}$. Detection signals from the comparators $4_4$ and $6_2$ are input to an AND gate 28. An OR gate 30 is supplied with an output signal of the AND gate 28 and a detection signal from the comparator $2_4$. An output signal from the OR gate 30 is a front margin detection signal.

Figure 8:
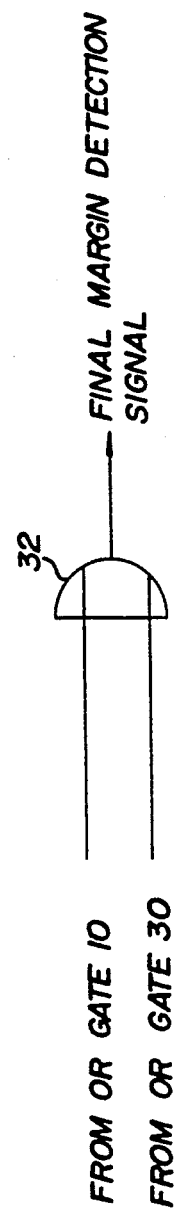
FIG. 8 is a circuit diagram of a circuit which is designed to combine a margin detection signal obtained by the first embodiment shown in FIG. 5 and a margin detection signal obtained by the second embodiment shown in FIG. 6.

In practical use, it is preferable to use the combination of the configurations shown in FIGS. 5 and 6. In this arrangement, an OR gate 32 shown in FIG. 8 is used. The OR gate 32 is supplied with the back margin detection signal from the OR gate 10 and the front margin detection signal from the OR gate 30. An output signal of the OR gate 32 is a finalized margin detection signal. When the front and back margin areas are correctly detected. The finalized margin detection signal is output from the OR gate 32 twice.

Figure 9B:
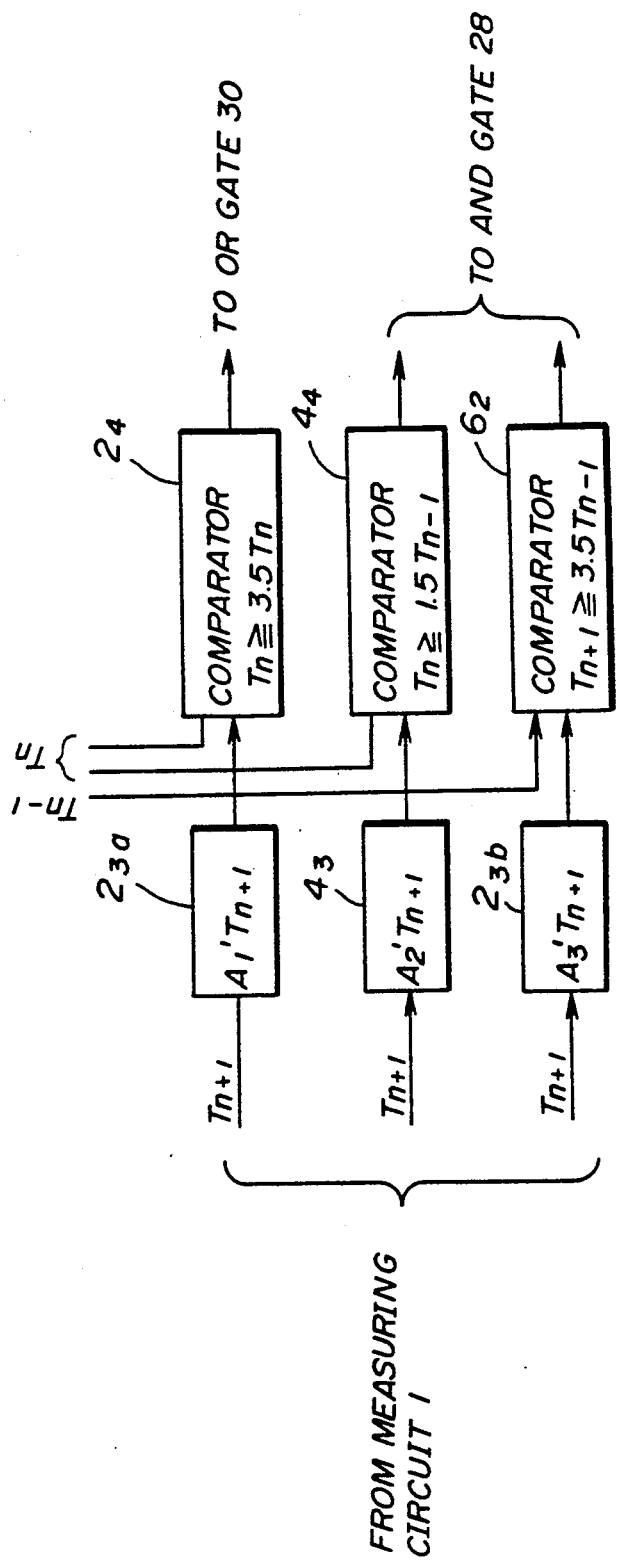
FIG. 9B is a block diagram of a variation of the second embodiment shown in FIG. 6.

In the configuration shown in FIG. 5, the multiplier $2_1$ is provided in common to the comparators $2_2$ and $6_1$. Alternatively, as shown in FIG. 9A, it is possible to provide two multipliers $2_{1a}$ and $2_{1b}$ having different coefficients $A_1$ and $A_3$ for the comparators $2_2$ and $6_1$, respectively. As shown in FIG. 9B, a similar arrangement to that shown in FIG. 9A is applicable to the configuration shown in FIG. 6. Two multipliers $2_{3a}$ and $2_{3b}$ are provided having different coefficients $A_1'$ and $A_3'$. The coefficient of the multiplier $4_3$ is represented by $A_2'$. For example, $A_1 = A_3 = A_1' = A_3'$, and $A_2 = A_2'$.

The present invention is not limited to the aforementioned embodiments, and variations and modifications may be made without departing from the scope of the present invention.

What is claimed is:

1. A bar code reading apparatus comprising:
   scanning means for scanning a bar code including a character bar and a guard bar facing a margin area surrounded by a margin defining area and for generating a pulse signal corresponding to said bar code;
   measuring means coupled to said scanning means, for measuring a width of each white bar contained in said bar code and a width of each black bar contained therein and for outputting a measurement signal indicative of the width of said each white or black bar;
   first detection means, operatively coupled to said measuring means, for detecting, from said measurement signal, a white bar having a width equal to or greater than a first reference value and for outputting a first detection signal indicative of the width of said white bar;
   second detection means, operatively coupled to said measuring means, for detecting, from said measurement signal, a white bar having a width equal to or greater than a second reference value and for outputting a second detection signal indicative of the width of said white bar, said second reference being less than said first reference;
   third detection means, operatively coupled to said measuring means, for detecting, from said measurement signal, a black bar having a width equal or greater than a third reference value and for outputting a third detection signal indicative of the width of said black bar; and
   logic means coupled to said first, second and third detection means, for receiving said first, second and third detection signals and outputting a margin detection signal indicating detection of said margin area on the basis of the first, second and third detection signals.

2. A bar code reading apparatus as claimed in claim 1, wherein said first reference value corresponds to a predetermined normal width of said margin area, said second reference value is equal to a predetermined minimum value of said margin area, and said third reference value corresponds to said predetermined normal width of said margin area.

3. A bar code reading apparatus as claimed in claim 1, wherein said measurement signal includes a time-series of measured value signals $T_{n-1}$ (n is an integer), $T_n$ and $T_{n+1}$, wherein said bar code reading apparatus comprises:
   first holding means coupled to said measuring means, for holding one of said measured value signals until a next one of said measured value signals is output from said measuring means so that when the measured value signal $T_{n+1}$ is applied to said first holding means, said first holding means outputs said measured value signal $T_n$; and
   second holding means coupled to said first holding means, for holding one of said measurement value signals from said first holding means until a next one of said measured value signals is output from said first holding means so that when the measured value signal $T_{n+1}$ is applied to said second holding means, said second holding means outputs said measured value signal $T_{n-1}$, and wherein said measured value signal $T_{n-1}$ is supplied to said first, second and third detection means, said measured value signal $T_n$ is supplied to said first and second detection means, and said measured value signal $T_{n+1}$ is supplied to said third detection means.

4. A bar code reading apparatus as claimed in claim 3, wherein:

said first detection means comprises multiplying means for multiplying said measured value signal $T_{n-1}$ by a first constant $A_1$ and for outputting a signal $A_1T_{n-1}$, and comparing means for determining whether said measured value signal $T_n$ is equal to or greater than $A_1T_{n-1}$ and for outputting said first detection signal based on a comparison result;

said second detection means comprises multiplying means for multiplying said measured value signal $T_{n-1}$ by a second constant $A_2$ and for outputting a signal $A_2T_{n-1}$, and comparing means for determining whether said measured value signal $T_n$ is equal to or greater $A_2T_{n-1}$ and for outputting said second detection signal based on a comparison result; and said third detection means comprises multiplying means for multiplying said measured value signal $T_{n-1}$ by a third coefficient $A_3$ and for outputting a signal $A_3T_{n-1}$, and comparing means for determining whether said measured value signal $T_{n+1}$ is equal to or greater than said signal $A_3T_{n-1}$ and for outputting said third detection signal based on a comparison result.

5. A bar code reading apparatus as claimed in claim 4, wherein said logic means comprises:

an AND gate provided with said second and third detection signals from said comparators of said second and third detection means and generating an output signal; and an OR gate provided with said first detection signal from said comparator of said first detection means and said output signal from said AND gate, said OR gate outputting said margin detection signal.

6. A bar code reading apparatus as claimed in claim 4, wherein said first constant $A_1$ is set equal to said third constant $A_3$, and said multiplying means of said first and third means are provided by a single multiplier.

7. A bar cord reading apparatus as claimed in claim 1, wherein said measurement signal includes a time-series of measured value signals $T_{n-1}$ (n is an integer), $T_n$ and $T_{n+1}$, wherein said bar code reading apparatus comprises:

first holding means coupled to said measuring means, for holding one of said measurement value signals until a next one of the measured value signals is output from said measuring means so that when the measured value signal $T_{n+1}$ is applied to said first holding means, said first holding means outputs said measured value signal $T_n$; and second holding means coupled to said first holding means, for holding one of said measured value signals from said first holding means until a next one of the measurement signals is output from said first holding means so that when the measured value signal $T_{n+1}$ is applied to said second holding means, said second holding means outputs said measured value signal $T_{n-1}$, and wherein said measured value signal $T_{n-1}$ is supplied to said third detection means, said measured value signal $T_n$ is supplied to said first and second detection means, and said measured value signal $T_{n+1}$ is supplied to said first, second and third detection means.

8. A bar code reading apparatus as claimed in claim 7, wherein:

said first detection means comprises multiplying means for multiplying said measured value signal $T_{n+1}$ by a first constant $A_1$ and for outputting a signal $A_1T_{n+1}$, and comparing means for determining whether said measured value signal $T_n$ is equal to or greater than $A_1T_{n+1}$ and for outputting said first detection signal based on a comparison result, said second detection means comprises multiplying means for multiplying said measured value signal $T_{n+1}$ by a second constant $A_2$ and for outputting a signal $A_2T_{n+1}$, and comparing means for determining whether said measured value signal $T_n$ is equal to $A_2T_{n+1}$ and for outputting said second detection signal based on a comparison result, and said third detection means comprises multiplying means for multiplying said measured value signal $T_{n+1}$ by a third coefficient $A_3$ and for outputting a signal $A_3T_{n-1}$, and comparing means for determining whether said measured value signal $T_{n-1}$ is equal to or greater than said signal $A_3T_{n+1}$ and for outputting said third detection signal based on a comparison result.

9. A bar code reading apparatus as claimed in claim 8, wherein said logic means comprises:

an AND gate provided with said second and third detection signals from said comparators of said second and third detection means and generating an output signal; and an OR gate provided with said first detection signal from said comparator of said first detection means and said output signal from said AND gate, said OR gate outputting said margin detection signal.

10. A bar code reading apparatus as claimed in claim 8, wherein said first constant $A_1$ is set equal to said third constant $A_3$, and said multiplying means of said first and third means are provided by a single multiplier.

11. A bar code reading apparatus as claimed in claim 1, wherein said logic means comprises:

an AND gate provided with said second and third detection signals from said second and third detection means and generating an output signal; and an OR gate provided with said first detection signal from said first detection means and said output signal from said AND gate, and said margin detection signal is output from said OR gate.

12. A bar code reading apparatus as claimed in claim 3, wherein:

said first detection means comprises multiplying means for multiplying said measured value signal $T_{n-1}$ by a first constant $A_1$ and for outputting a signal $A_1T_{n-1}$, and comparing means for determining whether said measured value signal $T_n$ is equal to or greater than $A_1T_{n-1}$ and for outputting said first detection signal based on a comparison result;

said second detection means comprises multiplying means for multiplying said measured value signal $T_{n-1}$ by a second constant $A_2$ and for outputting a signal $A_2T_{n-1}$, and comparing means for determining whether said measured value signal $T_n$ is equal to or greater $A_2T_{n-1}$ and for outputting said second detection signal based on a comparison result; and said third detection means comprises comparing means for determining whether said measured value signal $T_{n+1}$ supplied from said measuring means is equal to or greater than said signal $A_1T_{n-1}$ supplied from said multiplying means of said first detection means and for outputting said third detection signal based on a comparison result.

13. A bar code reading apparatus as claimed in claim 7, wherein:

said first detection means comprises multiplying means for multiplying said measured value signal $T_{n+1}$ by a first constant $A_1$ and for outputting a signal $A_1T_{n+1}$, and comparing means for determining whether said measured value signal $T_n$ is equal to or greater than $A_1T_{n+1}$ and for outputting said first detection signal based on a comparison result;

said second detection means comprises multiplying means for multiplying said measured value signal $T_{n+1}$ by a second constant $A_2$ and for outputting a signal $A_2T_{n+1}$, and comparing means for determining whether said measured value signal $T_n$ is equal to $A_2T_{n+1}$ and for outputting said second detection signal based on a comparison result; and said third detection means comprises comparing means for determining whether said measured value signal $T_{n-1}$ supplied from said second holding means is equal to or greater than said signal $A_1T_{n+1}$ supplied from said multiplying means of said first detection means and for outputting said third detection signal based on a comparison result.

14. A bar code reading apparatus comprising:

scanning means for scanning a bar code including a character bar and guard bars facing front and back margin areas surrounded by a margin defining area and for generating a pulse signal corresponding to said bar code;

measuring means coupled to said scanning means, for measuring a width of each white bar contained in said bar code and a width of each black bar contained therein and for outputting a measurement signal indicative of the width of said each white or black bar, said measurement signal includes a time-series of measured value signals $T_{n-1}$ (n is an integer), $T_n$ and $T_{n+1}$;

first holding means coupled to said measuring means, for holding one of said measured value signals until a next one of the measured value signals is output from said measuring means so that when the measured value signal $T_{n+1}$ is applied to said first holding means, said first holding means outputs said measured signal $T_n$;

second holding means coupled to said first holding means, for holding one of said measured value signals from said first holding means until a next one of the measured value signals is output from said first holding means so that when the measured value signal $T_{n+1}$ is applied to said second holding means, said second holding means outputs said measured value signal $T_{n-1}$;

first multiplying means coupled to said second holding means, for multiplying said measured value signal $T_{n-1}$ by a first constant $A_1$ and for outputting a signal $A_1T_{n-1}$;

first comparing means coupled to said first holding means and said first multiplying means, for determining whether said measured value signal $T_n$ is equal to or greater than $A_1T_{n-1}$ and for outputting a first detection signal based on a comparison result;

second multiplying means coupled to said second holding means, for multiplying said measured value signal $T_{n-1}$ by a second constant $A_2$ and for outputting a signal $A_2T_{n-1}$;

second comparing means coupled to said first holding means and said second multiplying means, for determining whether said measured value signal $T_n$ is equal to $A_2T_{n-1}$ and for outputting a second detection signal based on a comparison result;

third comparing means coupled to said measuring means and said first multiplying means, for determining whether said measured value signal $T_{n+1}$ is equal to or greater than said signal $A_1T_{n-1}$ and for outputting a third detection signal based on a comparison result;

third multiplying means coupled to said first holding means, for multiplying said measured value signal $T_{n+1}$ by a third constant $A_1'$ and for outputting a signal $A_1'T_{n+1}$;

fourth comparing means coupled to said measuring means and said third multiplying means, for determining whether said measured value signal $T_n$ is equal to or greater than $A_1'T_{n+1}$ and for outputting a fourth detection signal based on a comparison result;

fourth multiplying means coupled to said measuring means, for multiplying said measured value signal $T_{n+1}$ by a fifth constant $A_2'$ and for outputting a signal $A_2'T_{n+1}$;

fifth comparing means coupled to said first holding means and said fourth multiplying means, for determining whether said measured value signal $T_n$ is equal to $A_2'T_{n+1}$ and for outputting a fifth detection signal based on a comparison result;

sixth comparing means coupled to said second holding means and said third multiplying means, for determining whether said measured value signal $T_{n-1}$ is equal to or greater than said signal $A_1'T_{n+1}$ and for outputting a sixth detection signal based on a comparison result; and logic means for receiving said first through sixth detection signals and for outputting a margin detection signal indicative of said front and back margins on the basis of said first through sixth detection signal.

15. A bar code reading apparatus as claimed in claim 14, wherein said logic means comprises:

a first AND gate supplied with said second and third detection signals and generating a first AND output signal;

a first OR gate supplied with said first detection signal and said first AND output signal and a first OR output signal;

a second AND gate supplied with said fifth and sixth detection signals and generating a second AND output signal;

a second OR gate supplied with said fourth detection signal and said second AND output signal and outputting a second OR output signal; and a third OR gate supplied with said first and second OR output signals and outputting said margin detection signal.

16. A bar code reading apparatus as claimed in claim 14, wherein each of said first and third reference values corresponds to a predetermined normal width of each of said front and back margin area, and each of said second and third reference values corresponds to a predetermined minimum width of each of said front and back margin areas.

17. A bar code reading apparatus comprising:

scanning means for scanning a bar code including a character bar and guard bars facing front and margin areas surrounded by a margin defining area and for generating a pulse signal corresponding to said bar code;

measuring means coupled to said scanning means, for measuring a width of each white bar contained in said bar code and a width of each black bar contained therein and for outputting a measurement signal indicative of the width of said each white or black bar, said measurement signal includes a time-series of measured value signals $T_{n-1}$ (n is an integer), $T_n$ and $T_{n+1}$;

first holding means coupled to said measuring means, for holding one of said measured value signals until a next one of the measured value signals is output from said measuring means so that when the measured value signal $T_{n+1}$ is applied to said first holding means, said first holding means outputs said measured signal $T_n$;

second holding means coupled to said first holding means, for holding one of said measured value signals from said first holding means until a next one of the measured value signals is output from said first holding means so that when the measured value signal $T_{n+1}$ is applied to said second holding means, said second holding means outputs said measured value signal $T_{n-1}$;

first multiplying means coupled to said second holding means, for multiplying said measured value signal $T_{n-1}$ by a first constant $A_1$ and for outputting a signal $A_1T_{n-1}$;

first comparing means coupled to said first holding means and said first multiplying means, for determining whether said measured value signal $T_n$ is equal to or greater than $A_1T_{n-1}$ and for outputting a first detection signal based on a comparison result;

second multiplying means coupled to said second holding means, for multiplying said measured value signal $T_{n-1}$ by a second constant $A_2$ and for outputting a signal $A_2T_{n-1}$;

second comparing means coupled to said first holding means and said second multiplying means, for determining whether said measured value signal $T_n$ is equal to $A_2T_{n-1}$ and for outputting a second detection signal based on a comparison result;

third multiplying means coupled to said second holding means, for multiplying said measured value signal $T_{n-1}$ by a third coefficient $A_3$ and for outputting a signal $A_3T_{n-1}$;

third comparing means coupled to said measuring means and said third multiplying means, for determining whether said measured value signal $T_{n+1}$ is equal to or greater than said signal $A_3T_{n-1}$ and for outputting a third detection signal based on a comparison result;

fourth multiplying means coupled to said measuring means, for multiplying said measured value signal $T_{n+1}$ by a fourth constant $A_1'$ and for outputting a signal $A_1'T_{n+1}$;

fourth comparing means coupled to said first holding means and said fourth multiplying means, for determining whether said measured value signal $T_n$ is equal to or greater than $A_1'T_{n+1}$ and for outputting a fourth detection signal based on a comparison result;

fifth multiplying means coupled to said first holding means, for multiplying said measured value signal $T_{n+1}$ by a fifth constant $A_2'$ and for outputting a signal $A_2'T_{n+1}$;

fifth comparing means coupled to said measuring means and said fifth multiplying means, for determining whether said measured value signal $T_n$ is equal to $A_2'T_{n+1}$ and for outputting a fifth detection signal based on a comparison result;

sixth multiplying means coupled to said second holding means, for multiplying said measured value signal $T_{n+1}$ by a sixth coefficient $A_3'$ and for outputting a signal $A_3'T_{n-1}$;

sixth comparing means coupled to said measuring means and said sixth multiplying means, for determining whether said measured value signal $T_{n-1}$ is equal to or greater than said signal $A_3'T_{n+1}$ and for outputting a sixth detection signal based on a comparison result; and logic means for receiving said first through sixth detection signals and for outputting a margin detection signal indicative of said front and back margins on the basis of said first through sixth detection signal.

18. A bar code reading apparatus as claimed in claim 17, wherein said logic means comprises:

a first AND gate supplied with said second and third detection signals and generating a first AND output signal;

a first OR gate supplied with said first detection signal and said first AND output signal and a first OR output signal;

a second AND gate supplied with said fifth and sixth detection signals and generating a second AND output signal;

a second OR gate supplied with said fourth detection signal and said second AND output signal and outputting a second OR output signal; and a third OR gate supplied with said first and second OR output signals and outputting said margin detection signal.

19. A bar code reading apparatus as claimed in claim 17, wherein each of said first, third, fourth and sixth reference values corresponds to a predetermined normal width of each of said front and back margin areas, and each of said second and fourth reference values corresponds to a predetermined minimum width of each of said front and back margin areas.

* * * * *